(12) United States Patent
Matsumura et al.

(10) Patent No.: US 10,446,873 B2
(45) Date of Patent: Oct. 15, 2019

(54) SOLID-STATE BATTERY

(71) Applicant: INTEL CORPORATION, Santa Clara, CA (US)

(72) Inventors: Naoki Matsumura, San Jose, CA (US); Andrew Keates, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 15/395,400

(22) Filed: Dec. 30, 2016

(65) Prior Publication Data

US 2018/0191025 A1 Jul. 5, 2018

(51) Int. Cl.
| | |
|---|---|
| *H01M 10/0562* | (2010.01) |
| *H01M 10/0565* | (2010.01) |
| *H01M 10/054* | (2010.01) |
| *H01M 4/13* | (2010.01) |
| *H01M 4/36* | (2006.01) |
| *H01M 4/38* | (2006.01) |
| *H01M 10/052* | (2010.01) |

(52) U.S. Cl.
CPC ......... *H01M 10/0562* (2013.01); *H01M 4/13* (2013.01); *H01M 4/364* (2013.01); *H01M 4/382* (2013.01); *H01M 10/052* (2013.01); *H01M 10/054* (2013.01); *H01M 10/0565* (2013.01)

(58) Field of Classification Search
CPC ............. H01M 10/0525; H01M 4/136; H01M 10/0565; H01M 4/137; H01M 4/134; H01M 10/0562; H01M 10/058
See application file for complete search history.

(56) References Cited

U.S. PATENT DOCUMENTS

| | | | | |
|---|---|---|---|---|
| 9,647,265 B2 * | 5/2017 | Eisele | ................... | H01M 4/366 |
| 9,780,360 B2 * | 10/2017 | Mizutani | ............... | H01M 4/131 |
| 9,917,326 B2 * | 3/2018 | Furukawa | ......... | H01M 10/0562 |
| 2012/0115028 A1 * | 5/2012 | Ueno | ...................... | H01M 4/13 |
| | | | | 429/209 |
| 2014/0162138 A1 * | 6/2014 | Fujiki | ............... | H01M 10/0562 |
| | | | | 429/322 |
| 2014/0220454 A1 * | 8/2014 | Furukawa | ............... | H01M 4/62 |
| | | | | 429/319 |
| 2015/0044576 A1 * | 2/2015 | Eisele | .................. | C01G 23/005 |
| | | | | 429/322 |
| 2015/0249264 A1 * | 9/2015 | Matsumura | ........... | H01M 4/485 |
| | | | | 429/304 |
| 2016/0204466 A1 * | 7/2016 | Nogami | ................ | H01M 4/136 |
| | | | | 429/322 |
| 2016/0233543 A1 * | 8/2016 | Homma | ............ | H01M 10/0562 |
| 2016/0380266 A1 * | 12/2016 | Suzuki | ................ | H01M 2/1646 |
| | | | | 429/162 |
| 2017/0179519 A1 * | 6/2017 | Okamoto | ........... | H01M 10/0525 |

* cited by examiner

*Primary Examiner* — Stewart A Fraser
(74) *Attorney, Agent, or Firm* — International IP Law Group, P.L.L.C.

(57) ABSTRACT

In one example, a battery includes a cathode, an anode, and a layer between the cathode and the anode. The cathode includes a solid-state electrolyte. The layer between the cathode and the anode is a solid-state electrolyte layer.

28 Claims, 3 Drawing Sheets

100

200

SOLID-STATE BATTERY

TECHNICAL FIELD

This disclosure relates generally to a solid-state battery.

BACKGROUND

A battery typically has one or more electrochemical cells with external connections provided to power electrical devices. A battery can supply electric power using a positive terminal (for example, a cathode) and a negative terminal (for example, an anode). The negative terminal is a source of electrons that, when connected to an external circuit, will flow and deliver energy to an external device. When connected to the external circuit, ions in electrolytes are able to move within the battery, allowing chemical reactions to be completed at the positive and negative terminals in order to deliver energy to the external circuit. The movement of ions within the battery allows electrical current to flow out of the battery. A lithium-ion (Li-ion) battery is typically a rechargeable battery in which lithium ions can move from the negative electrode to the positive electrode during discharge of the battery and can move back from the positive electrode to the negative electrode during charging of the battery.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF SOME EMBODIMENTS

Some embodiments relate to solid-state batteries. Some embodiments relate to solid-state batteries that include solid-state electrolyte (SSE) material. Some embodiments relate to solid-state batteries that include ceramic solid-state electrolyte material.

Some embodiments relate to solid-state lithium ion (Li-ion) batteries that include solid-state electrolyte material (for example, ceramic solid-state electrolyte material). A solid-state lithium ion battery with ceramic solid-state electrolyte provides a higher volumetric energy density than a lithium ion battery with liquid or gel-polymer electrolyte material.

In some embodiments, a solid-state battery with ceramic solid-state electrolyte can be fabricated with physical vapor deposition (PVD). Physical vapor deposition can enable very thin solid-state electrolyte layers (for example, 1 µm or less thick) that can be used as a separator between an anode and a cathode of the battery. Such a layer is much thinner than a lithium ion battery with a separator between an anode and cathode, where the separator includes a liquid or a polymer material (for example, around 10 µm thick).

In some embodiments, a ceramic solid-state electrolyte material is used for a separator between a cathode and an anode of a battery. A ceramic solid-state electrolyte separator can be robust against dendrite from a lithium metal anode during charging of the battery. In some embodiments, a ceramic solid-state electrolyte separator can enable use of a lithium metal anode, which can have higher energy density than a graphite anode.

According to some embodiments, a solid-state battery can be safer than a battery that includes liquid electrolytes. For example, solid-state batteries can be safer than batteries with liquid electrolytes that are volatile and flammable. For example, a lithium ion solid-state battery can be less dangerous (that is, less volatile and less flammable) than a lithium ion battery that includes liquid electrolytes.

Figure 1:
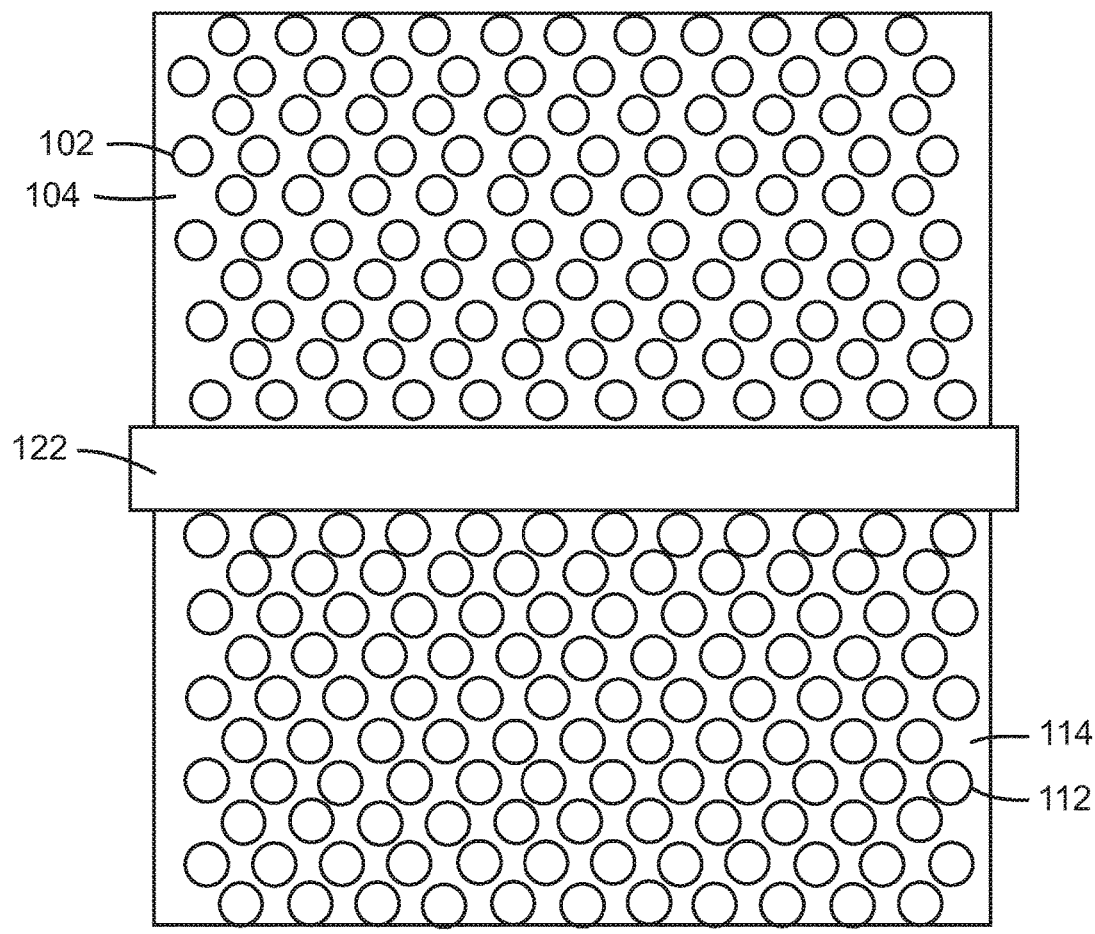
FIG. 1 illustrates a cross-section view of a portion of a battery (for example, without a current collector or a package)

FIG. 1 illustrates a cross-sectional view of a battery 100 (for example, a lithium ion battery). In some embodiments, FIG. 1 illustrates a cross-sectional view of a portion 100 of a battery (for example, without a current collector or a package). Lithium ion (Li-ion) battery 100 includes a cathode active material 102 and a gel-polymer or liquid electrolyte 104. Lithium ion battery 100 further includes an anode active material 112 (for example, a graphite anode) and a gel-polymer or liquid electrolyte 114. Lithium ion battery 100 further includes a separator 122 containing a liquid or polymer electrolyte. In some examples, separator 122 is, for example, approximately 10 µm (micrometers) thick.

Figure 2:
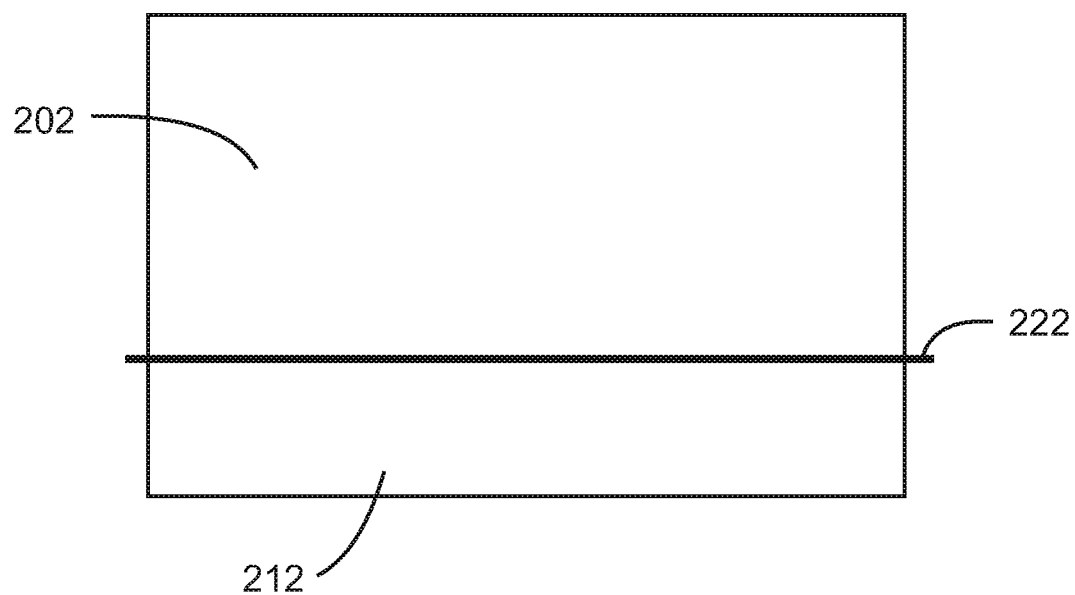
FIG. 2 illustrates a cross-section view of a portion of a battery (for example, without a current collector or a package)

FIG. 2 illustrates a cross-sectional view of a solid-state battery 200. In some embodiments, FIG. 2 illustrates a cross-sectional view of a portion 200 of a battery (for example, without a current collector or a package). In some embodiments battery 200 (or portion 200 of a battery) is a solid-state lithium ion battery (or portion 200 of a solid-state lithium ion battery). Solid-state lithium ion battery 200 includes a cathode electrode 202 and an anode electrode 212. In some embodiments, cathode electrode 202 and anode electrode 212 are solid materials. In some embodiments, for example, anode 212 is lithium metal. Solid-state lithium ion battery 200 also includes a layer 222 between the cathode 202 and the anode 212. In some embodiments, layer 222 can be made of solid-state electrolyte material (for example, ceramic solid-state electrolyte material).

Figure 3:
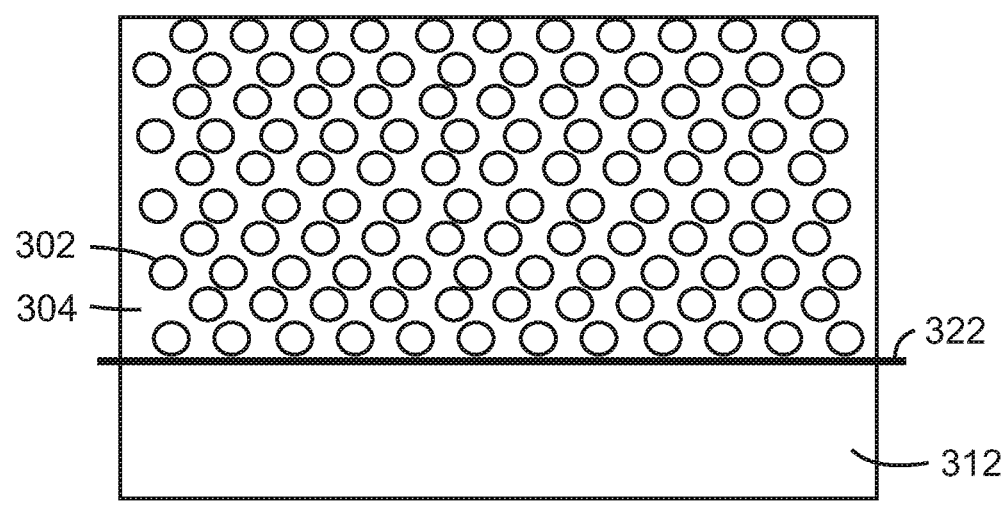
FIG. 3 illustrates a cross-section view of a portion of a battery (for example, without a current collector or a package)

FIG. 3 illustrates a cross-sectional view of a solid-state battery 300. In some embodiments, FIG. 3 illustrates a cross-sectional view of a portion 300 of a battery (for example, without a current collector or a package). In some embodiments, battery 300 (or portion 300 of a battery) is a solid-state lithium ion battery (or portion 300 of a solid-state lithium ion battery). Solid-state lithium ion battery 300 includes a cathode active material 302 and a solid-state electrolyte (SSE) 304. In some embodiments, cathode active material 302 is made of particles. Solid-state lithium ion battery 300 also includes an anode electrode 312 (for example, an anode 312 made of lithium metal). In some embodiments, anode electrode 312 is a solid (for example, a solid metal). Solid-state lithium ion battery 300 further includes a layer 322 between the cathode 302 and the anode 312. In some embodiments, layer 322 is a thin separation layer. In some embodiments, layer 322 is made of ceramic solid-state electrolyte material. In some embodiments, layer 322 is approximately 1 µm thick.

In some embodiments, for example, solid-state electrolyte 304 is a polymer solid-state electrolyte. In some embodiments, for example, solid-state electrolyte 304 is a sulfide solid-state electrolyte. In some embodiments, using a polymer or sulfide solid-state electrolyte as the solid-state electrolyte 304 around the cathode active material 302 can keep high ionic conductivity (and therefore lower resistance) while maintaining almost no chemical reaction with the cathode 302 or the layer 322 (for example, a ceramic solid-state electrolyte separation layer 322).

In some embodiments, a polymer solid-state electrolyte and/or a sulfide solid-state electrolyte is provided in and/or around a cathode area of a battery (for example, solid-state electrolyte 304).

In some embodiments, a battery can have a thin and hard solid-state electrolyte layer (for example, a thin and hard solid-state electrolyte separator layer between a cathode and an anode of the battery) that can be made for high energy density while maintaining fast ionic conductivity and low resistance (for example, due to the thin nature of the electrolyte layer).

It is noted that polymer solid-state electrolyte and/or sulfide solid-state electrolyte can be thicker than ceramic solid-state electrolyte. For example, polymer solid-state electrolyte can be made using a polymerization process that results in a layer of approximately 10 μm thickness, and/or sulfide solid-state electrolyte is a solid-state particle that may need approximately 10 μm thickness to be a reliable separation layer. However, in some embodiments, ceramic solid-state electrolyte can be made in a layer that can be much thinner (for example, 1 μm in thickness).

In some embodiments, a ceramic solid-state electrolyte material layer 322 is provided between the cathode 302 and the anode 312, and can work as a thin separation layer. A ceramic solid-state electrolyte material layer 322 can also enable use of a lithium metal anode 312 which has high energy density. Although ionic conductivity of ceramic solid-state electrolyte material is low, an impact of layer 322 made of ceramic solid-state electrolyte material can be relatively low, since in some embodiments a thickness of layer 322 is relatively low compared with a thickness of the battery 300. For example, in some embodiments, layer 322 can be approximately 1 μm thick, and the entire battery cell 300 can be approximately 100 μm thick.

In a lithium ion solid-state battery (for example, such as solid-state battery 200 in some embodiments), lithium ions may move in solid materials which have low lithium ion ionic conductivity (for example, in cathode 202, anode 212, and 222). For example, the lithium ion ionic conductivity in a lithium ion solid-state battery can be approximately $10^{-6}$ S/cm (siemens per centimeter) where anode, separator and cathode are all solid materials. In a lithium ion battery that has liquid electrolyte (for example, such as battery 100 in some embodiments), the lithium ion ionic conductivity can be higher (approximately $10^{-2}$ S/cm in some embodiments).

In some embodiments, instead of using a ceramic solid-state electrolyte material, polymer solid-state electrolyte material or sulfide solid-state electrolyte material can be used. For example, a polymer solid-state electrolyte material or sulfide solid-state electrolyte material may have higher ionic conductivity than $10^{-3}$ S/cm (for example, in some embodiments, a polymer solid-state electrolyte material or sulfide solid-state electrolyte material may have ionic conductivity in a range of approximately $10^{-2}$ S/cm to $10^{-3}$ S/cm. In some embodiments with a cathode with solid-state electrolyte material such as, for example, polymer solid-state electrolyte or sulfide solid-state electrolyte, lithium ions may have ionic conductivity in a range of approximately $10^{-2}$ S/cm to $10^{-3}$ S/cm through a cathode (for example, through material 304 of cathode 302) and ionic conductivity in a range of approximately $10^{-6}$ S/cm through a thin ceramic solid-state electrolyte material (for example, through layer 322).

In some embodiments, a different solid-state electrolyte is used in two or more different layers of a battery. For example, in some embodiments, a ceramic solid-state electrolyte is used in a layer between a cathode electrode and an anode electrode and a polymer solid-state electrolyte and/or a sulfide solid-state electrolyte is used in the cathode electrode.

In some embodiments, a solid-state battery can be used that includes strategic use of solid-state electrolytes. For example, a ceramic solid-state electrolyte separator can be used between a cathode and an anode. In some embodiments, the ceramic solid-state electrolyte can be 1 μm or thinner. This ceramic solid-state electrolyte can be solid. In some embodiments, a polymer solid-state electrolyte or a sulfide solid-state electrolyte can be used in or around the cathode area. This polymer solid-state electrolyte or sulfide solid-state electrolyte can be solid.

In some embodiments, a solid-state battery can be used with two or more different kinds of solid-state electrolytes. Although a ceramic solid-state electrolyte can be used as a separator in some embodiments, although the ionic conductivity of a ceramic solid-state electrolyte can be low, since the ceramic solid-state electrolyte can be very thin, the overall impact on the impedance of the battery can be very small. In some embodiments, a solid-state electrolyte such as a polymer solid-state electrolyte or a sulfide solid-state electrolyte has a relatively high ionic conductivity that is similar, for example, to a liquid electrolyte. Therefore, in some embodiments, by combining two or more types of solid-state electrolytes, ions such as lithium ions can move from the cathode to the anode or from the anode to the cathode while maximizing ionic conductivity and minimizing impedance.

In some embodiments, a solid-state battery such as, for example, battery 300, can be fabricated by beginning with first making a cathode layer. A cathode is combined with a solid-state electrolyte such as, for example, a polymer solid-state electrolyte or a sulfide solid-state electrolyte. This can make a slurry or a solid-state electrode. On top of the cathode electrode, the manufacturer can deposit a ceramic solid-state electrolyte (for example, using a vacuum process). On the resulting ceramic solid-state electrolyte surface, a manufacturer may deposit lithium metal for the anode electrode. Alternatively, instead of depositing lithium metal, the manufacturer may place a copper collector for the anode. In this situation, after the manufacturer charges the device, the lithium metal is formed. In some embodiments, the manufacturer need not fully charge the device. For example, the manufacturer may only charge the device 50%. The lithium metal is formed upon first charging of the device, but it need not be fully charged for the lithium metal to form. As long as there is a current collector which is metal (for example, a copper current collector) the lithium metal will be formed upon charging. In some embodiments, a small lithium metal layer may be formed prior to charging as a seed layer in order to form the lithium metal anode.

In some embodiments, a solid-state battery such as, for example, battery 300, can be fabricated by beginning with first making an anode, for example, using a copper current collector layer. On top of that layer, the manufacturer may fabricate a lithium layer (for example, a lithium seed layer). Then the manufacturer may fabricate a thin ceramic solid-state electrolyte layer on top of the seed layer. On top of the ceramic solid-state electrolyte layer, the manufacturer may add a mixture of a cathode and solid-state electrolyte (for example, a polymer solid-state electrolyte or a sulfide solid-state electrolyte).

Some embodiments have been described herein as being related to lithium ion (Li-ion) batteries. However, some embodiments can be implemented in lithium sulfur (Li-Sulfur) batteries, magnesium ion (Mg-ion) batteries, and/or aluminum ion (Al-ion) batteries, etc.

Some embodiments can use solid-state electrolytes for one or more layers in a battery. Although battery layers with polymer solid-state electrolytes, sulfide solid-state electrolytes and ceramic solid-state electrolytes have been described herein, some embodiments use different electrolytes and/or solid-state electrolytes.

In some embodiments, a solid-state electrolyte may be made in a process where a liquid electrolyte is heat-treated after complete battery cell assembly to solidify the electrolyte. This can provide a solid electrolyte that has permeated anode and/or cathode active materials. In some embodiments, a combination of solid-state electrolytes can be, for example, a particle sulfide solid-state electrolyte for a cathode, and/or a thin-film sulfide solid-state electrolyte in between a cathode and an anode.

In some embodiments, if an anode is made of particles, for example, a solid-state electrolyte may be used in an anode electrode (for example, in a manner similar to that used in a cathode electrode according to some embodiments).

Some embodiments have been described herein as having lithium metal anodes (for example, anode 212 and anode 312). However, in some embodiments, a solid-state battery can include other anodes such as graphite anodes. For example, in some embodiments anode 212 and/or anode 312 can be graphite anodes. In some embodiments, an anode can include a mixture of graphite plus solid-state electrolytes (for example, similar to the mixture of the cathode 302 with solid-state electrolyte 304). In some embodiments, an anode can include a mixture of graphite plus a polymer solid-state electrolyte or a mixture of graphite plus a sulfide solid-state electrolyte.

In some embodiments, a ceramic solid-state electrolyte may be used which is a lithium phosphate oxynitride (Li-PON). In some embodiments, a ceramic solid-state electrolyte may be used which is other materials.

In some embodiments, a polymer solid-state electrolyte may be used which is a polyethylene oxide (PEO). In some embodiments, a polymer solid-state electrolyte may be used which is other materials.

In some embodiments, a sulfide solid-state electrolyte may be used which is an LGPS material (for example, $Li_{10}GeP_2S_{12}$). In some embodiments, a sulfide solid-state electrolyte may be used which is other materials.

In some embodiments, an anode electrode included in a battery can have a current collector, and/or a cathode electrolyte can have a current collector, and/or a battery can be enclosed with a package.

In some embodiments, a battery may include one or more stack of cathode, anode and/or solid-state electrolyte layer.

In some embodiments, a battery may include a winding structure of cathode, anode and/or solid-state electrolyte layer.

In some embodiments, a battery as described herein can be included in any type of electronic device or system, including for example, any electronic device, mobile device, computing device, phone, tablet, desktop computer, laptop computer, automobile, or any other type of device or system that might include or use a battery.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1

In some examples, a battery includes a cathode, an anode, and a layer between the cathode and the anode. The cathode includes a solid-state electrolyte. The layer between the cathode and the anode is a solid-state electrolyte layer.

Example 2

In some examples, the battery of Example 1, where the solid-state electrolyte included in the cathode is a polymer solid-state electrolyte.

Example 3

In some examples, the battery of Example 2, where the polymer solid-state electrolyte is polyethylene oxide.

Example 4

In some examples, the battery of Example 1, where the solid-state electrolyte included in the cathode is a sulfide solid-state electrolyte.

Example 5

In some examples, the battery of Example 4, where the sulfide solid-state electrolyte is $Li_{10}GeP_2S_{12}$.

Example 6

In some examples, the battery of Example 1, where the solid-state electrolyte layer is a ceramic solid-state electrolyte layer.

Example 7

In some examples, the battery of Example 6, where the ceramic solid-state electrolyte layer is lithium phosphate oxynitride.

Example 8

In some examples, the battery of Example 1, where the anode includes a solid-state electrolyte.

Example 9

In some examples, the battery of Example 1, where the battery is one or more of a lithium ion battery, a lithium sulfur battery, a magnesium ion battery, or an aluminum ion battery.

Example 10

In some examples, the battery of Example 1, where the solid-state electrolyte included in the cathode is a different type of solid-state electrolyte than the electrolyte included in the solid-state electrolyte layer.

Example 11

In some examples, the battery of Example 1, where the solid-state electrolyte included in the cathode is a polymer solid-state electrolyte and the solid-state electrolyte layer is a ceramic solid-state electrolyte layer.

Example 12

In some examples, the battery of Example 1, where the solid-state electrolyte included in the cathode is a sulfide solid-state electrolyte and the solid-state electrolyte layer is a ceramic solid-state electrolyte layer.

Example 13

In some examples, the battery of Example 1, where the solid-state electrolyte included in the cathode is a particle sulfide solid-state electrolyte and the solid-state electrolyte layer is a thin-film sulfide solid-state electrolyte layer.

Example 14

In some examples, the battery of Example 1, where a thickness of the solid-state electrolyte layer is 1 μm or less.

Example 15

In some examples, the battery of Example 1, where the anode is lithium metal.

Example 16

In some examples, the battery of Example 1, wherein an ionic conductivity of the solid-state electrolyte included in the cathode is in a range of $10^{-2}$ siemens per centimeter to $10^{-3}$ siemens per centimeter.

Example 17

In some examples, a method of manufacturing a battery includes forming a cathode including a solid-state electrolyte around a cathode active material, forming an anode, and forming a solid-state electrolyte layer between the cathode and the anode.

Example 18

In some examples, the method of Example 17, where the solid-state electrolyte included in the cathode is a polymer solid-state electrolyte.

Example 19

In some examples, the method of Example 17, where the solid-state electrolyte included in the cathode is a sulfide solid-state electrolyte.

Example 20

In some examples, the method of Example 17, where the solid-state electrolyte layer is a ceramic solid-state electrolyte layer.

Example 21

In some examples, the method of Example 17, where the anode includes a solid-state electrolyte.

Example 22

In some examples, the method of Example 17, where the battery is one or more of a lithium ion battery, a lithium sulfur battery, a magnesium ion battery, or an aluminum ion battery.

Example 23

In some examples, the method of Example 17, where the solid-state electrolyte included in the cathode is a different type of solid-state electrolyte than the electrolyte included in the solid-state electrolyte layer.

Example 24

In some examples, the method of Example 17, where a thickness of the solid-state electrolyte layer is 1 μm or less.

Example 25

In some examples, the method of Example 17, where the anode is lithium metal.

Example 26

In some examples, the method of Example 17, where an ionic conductivity of the solid-state electrolyte included in the cathode is in a range of $10^{-2}$ siemens per centimeter to $10^{-3}$ siemens per centimeter.

Example 27

In some examples, a battery includes a cathode including a solid-state electrolyte, an anode, and a solid-state electrolyte layer between the cathode and the anode.

Example 28

In some examples, the battery of EXAMPLE 27, where the solid-state electrolyte included in the cathode is a polymer solid-state electrolyte.

Example 29

In some examples, the battery of EXAMPLE 28, where the polymer solid-state electrolyte is polyethylene oxide.

Example 30

In some examples, the battery of EXAMPLE 27, where the solid-state electrolyte included in the cathode is a sulfide solid-state electrolyte.

Example 31

In some examples, the battery of EXAMPLE 30, where the sulfide solid-state electrolyte is $Li_{10}GeP_2S_{12}$.

Example 32

In some examples, the battery of EXAMPLE 27, where the solid-state electrolyte layer is a ceramic solid-state electrolyte layer.

Example 33

In some examples, the battery of EXAMPLE 32, where the ceramic solid-state electrolyte layer is lithium phosphate oxynitride.

Example 34

In some examples, the battery of EXAMPLE 27, where the anode includes a solid-state electrolyte.

Example 35

In some examples, the battery of EXAMPLE 27, where the battery is one or more of a lithium ion battery, a lithium sulfur battery, a magnesium ion battery, or an aluminum ion battery.

Example 36

In some examples, the battery of EXAMPLE 27, where the solid-state electrolyte included in the cathode is a polymer solid-state electrolyte and the solid-state electrolyte layer is a ceramic solid-state electrolyte layer.

Example 37

In some examples, the battery of EXAMPLE 27, where the solid-state electrolyte included in the cathode is a sulfide solid-state electrolyte and the solid-state electrolyte layer is a ceramic solid-state electrolyte layer.

Example 38

In some examples, the battery of EXAMPLE 27, where the solid-state electrolyte included in the cathode is a particle sulfide solid-state electrolyte and the solid-state electrolyte layer is a thin-film sulfide solid-state electrolyte layer.

Example 39

In some examples, the battery of EXAMPLE 27, where a thickness of the solid-state electrolyte layer is 1 µm or less.

Example 40

In some examples, the battery of EXAMPLE 27, where the anode is lithium metal.

Example 41

In some examples, the battery of EXAMPLE 27, where an ionic conductivity of the solid-state electrolyte included in the cathode is in a range of $10^{-2}$ siemens per centimeter to $10^{-3}$ siemens per centimeter.

Example 42

In some examples, the battery of any of EXAMPLES 27-41, where the solid-state electrolyte included in the cathode is a different type of solid-state electrolyte than the electrolyte included in the solid-state electrolyte layer.

Example 43

In some examples, a method of manufacturing a battery includes forming a cathode including a solid-state electrolyte, forming an anode, and forming a solid-state electrolyte layer between the cathode and the anode.

Example 44

In some examples, the method of EXAMPLE 43, where the solid-state electrolyte included in the cathode is a polymer solid-state electrolyte.

Example 45

In some examples, the method of EXAMPLE 43, where the solid-state electrolyte included in the cathode is a sulfide solid-state electrolyte.

Example 46

In some examples, the method of EXAMPLE 43, where the solid-state electrolyte layer is a ceramic solid-state electrolyte layer.

Example 47

In some examples, the method of EXAMPLE 43, where the anode includes a solid-state electrolyte.

Example 48

In some examples, the method of EXAMPLE 43, where the battery is one or more of a lithium ion battery, a lithium sulfur battery, a magnesium ion battery, or an aluminum ion battery.

Example 49

In some examples, the method of EXAMPLE 43, where a thickness of the solid-state electrolyte layer is 1 µm or less.

Example 50

In some examples, the method of EXAMPLE 43, where an ionic conductivity of the solid-state electrolyte included in the cathode is in a range of $10^{-2}$ siemens per centimeter to $10^{-3}$ siemens per centimeter.

Example 51

In some examples, the method of any of EXAMPLES 43-50, where the solid-state electrolyte included in the cathode is a different type of solid-state electrolyte than the electrolyte included in the solid-state electrolyte layer.

Example 52

In some examples, a battery includes a cathode including a solid-state electrolyte, an anode, and a solid-state electrolyte layer between the cathode and the anode.

Example 53

In some examples, the battery of any of the preceding EXAMPLES, where the solid-state electrolyte included in the cathode is a polymer solid-state electrolyte, and/or polyethylene oxide, and/or a sulfide solid-state electrolyte, and/or $Li_{10}GeP_2S_{12}$, and/or a particle sulfide solid-state electrolyte.

Example 54

In some examples, the battery of any of the preceding EXAMPLES, where the solid-state electrolyte layer is a ceramic solid-state electrolyte layer, and/or a lithium phosphate oxynitride layer, and/or a thin-film sulfide solid-state electrolyte layer.

Example 55

In some examples, the battery of any of the preceding EXAMPLES, where the anode includes lithium metal, and/or includes a solid-state electrolyte.

Example 56

In some examples, the battery of any of the preceding EXAMPLES, where a thickness of the solid-state electrolyte layer is 1 µm or less.

Example 57

In some examples, the battery of any of the preceding EXAMPLES, where an ionic conductivity of the solid-state electrolyte included in the cathode is in a range of $10^{-2}$ siemens per centimeter to $10^{-3}$ siemens per centimeter.

Example 58

In some examples, the battery of any of the preceding EXAMPLES, where the solid-state electrolyte included in the cathode is a different type of solid-state electrolyte than the electrolyte included in the solid-state electrolyte layer.

Example 59

In some examples, a method of manufacturing a battery includes forming a cathode including a solid-state electrolyte, forming an anode, and forming a solid-state electrolyte layer between the cathode and the anode.

Example 60

In some examples, the method of any of the preceding EXAMPLES, where the solid-state electrolyte included in the cathode is a polymer solid-state electrolyte, and/or polyethylene oxide, and/or a sulfide solid-state electrolyte, and/or $Li_{10}GeP_2S_{12}$, and/or a particle sulfide solid-state electrolyte.

Example 61

In some examples, the method of any of the preceding EXAMPLES, where the solid-state electrolyte layer is a ceramic solid-state electrolyte layer, and/or a lithium phosphate oxynitride layer, and/or a thin-film sulfide solid-state electrolyte layer.

Example 62

In some examples, the method of any of the preceding EXAMPLES, where the anode includes lithium metal, and/or includes a solid-state electrolyte.

Example 63

In some examples, the method of any of the preceding EXAMPLES, where a thickness of the solid-state electrolyte layer is 1 µm or less.

Example 64

In some examples, the method of any of the preceding EXAMPLES, where an ionic conductivity of the solid-state electrolyte included in the cathode is in a range of $10^{-2}$ siemens per centimeter to $10^{-3}$ siemens per centimeter.

Example 65

In some examples, the method of any of the preceding EXAMPLES, where the solid-state electrolyte included in the cathode is a different type of solid-state electrolyte than the electrolyte included in the solid-state electrolyte layer.

Although an example embodiment of the disclosed subject matter is described with reference to the drawings, persons of ordinary skill in the art will readily appreciate that many other ways of implementing the disclosed subject matter may alternatively be used. For example, the order of execution of the blocks in flow diagrams may be changed, and/or some of the blocks in block/flow diagrams described may be changed, eliminated, or combined. Additionally, some of the circuit and/or block elements may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. A battery comprising:
    a cathode including a solid-state electrolyte;
    an anode; and
    a solid-state electrolyte layer between the cathode and the anode, wherein a thickness of the solid-state electrolyte layer is 1 µm or less;
    wherein an ionic conductivity of the solid-state electrolyte included in the cathode is higher than an ionic conductivity of the solid-state electrolyte layer; and
    wherein the solid-state electrolyte included in the cathode is a different type of solid-state electrolyte than the solid-state electrolyte included in the solid-state electrolyte layer.

2. The battery of claim 1, wherein the solid-state electrolyte included in the cathode is a polymer solid-state electrolyte.

3. The battery of claim 2, wherein the polymer solid-state electrolyte is polyethylene oxide.

4. The battery of claim 1, wherein the solid-state electrolyte included in the cathode is a sulfide solid-state electrolyte.

5. The battery of claim 4, wherein the sulfide solid-state electrolyte is $Li_{10}GeP_2S_{12}$.

6. The battery of claim 1, wherein the solid-state electrolyte layer is a ceramic solid-state electrolyte layer.

7. The battery of claim 6, wherein the ceramic solid-state electrolyte layer is lithium phosphate oxynitride.

8. The battery of claim 1, wherein the anode includes a solid-state electrolyte.

9. The battery of claim 1, wherein the battery is one or more of a lithium ion battery, a lithium sulfur battery, a magnesium ion battery, or an aluminum ion battery.

10. The battery of claim 1, wherein the solid-state electrolyte included in the cathode is a polymer solid-state electrolyte and the solid-state electrolyte layer is a ceramic solid-state electrolyte layer.

11. The battery of claim 1, wherein the solid-state electrolyte included in the cathode is a sulfide solid-state electrolyte and the solid-state electrolyte layer is a ceramic solid-state electrolyte layer.

12. The battery of claim 1, wherein the solid-state electrolyte included in the cathode is a particle sulfide solid-state electrolyte and the solid-state electrolyte layer is a thin-film sulfide solid-state electrolyte layer.

13. The battery of claim 1, wherein the anode is lithium metal.

14. The battery of claim 1, wherein the ionic conductivity of the solid-state electrolyte included in the cathode is in a range of $10^{-2}$ siemens per centimeter to $10^{-3}$ siemens per centimeter.

15. The battery of claim 1, wherein a thickness of the battery is approximately 100 µm.

16. The battery of claim 1, wherein the solid-state electrolyte included in the cathode is a polymer or a sulfide, and the solid-state electrolyte layer is a ceramic solid-state electrolyte layer.

17. The battery of claim 1, wherein the ionic conductivity of the solid-state electrolyte included in the cathode is in a range of approximately $10^{-2}$ siemens per centimeter to $10^{-3}$ siemens per centimeter, and wherein the ionic conductivity of the solid-state electrolyte is on the order of approximately $10^{-6}$ siemens per centimeter.

18. A method of manufacturing a battery comprising:
    forming a cathode including a solid-state electrolyte;
    forming an anode; and
    forming a solid-state electrolyte layer between the cathode and the anode,
    wherein a thickness of the solid-state electrolyte layer is 1 µm or less;

wherein an ionic conductivity of the solid-state electrolyte included in the cathode is higher than an ionic conductivity of the solid-state electrolyte layer; and wherein the solid-state electrolyte included in the cathode is a different type of solid-state electrolyte than the solid-state electrolyte included in the solid-state electrolyte layer.

19. The method of claim 18, wherein the solid-state electrolyte included in the cathode is a polymer solid-state electrolyte.

20. The method of claim 18, wherein the solid-state electrolyte included in the cathode is a sulfide solid-state electrolyte.

21. The method of claim 18, wherein the solid-state electrolyte layer is a ceramic solid-state electrolyte layer.

22. The method of claim 18, wherein the anode includes a solid-state electrolyte.

23. The method of claim 18, wherein the battery is one or more of a lithium ion battery, a lithium sulfur battery, a magnesium ion battery, or an aluminum ion battery.

24. The method of claim 18, wherein the anode is lithium metal.

25. The method of claim 18, wherein the ionic conductivity of the solid-state electrolyte included in the cathode is in a range of $10^{-2}$ siemens per centimeter to $10^{-3}$ siemens per centimeter.

26. The method of claim 18, wherein the battery is fabricated using physical vapor deposition.

27. The method of claim 18, wherein the solid-state electrolyte included in the cathode is a polymer or a sulfide, and the solid-state electrolyte layer is a ceramic solid-state electrolyte layer.

28. The method of claim 18, wherein the ionic conductivity of the solid-state electrolyte included in the cathode is in a range of approximately $10^{-2}$ siemens per centimeter to $10^{-3}$ siemens per centimeter, and wherein the ionic conductivity of the solid-state electrolyte is on the order of approximately $10^{-6}$ siemens per centimeter.

* * * * *